United States Patent
Liao

(10) Patent No.: US 10,981,265 B2
(45) Date of Patent: Apr. 20, 2021

(54) FIRING PIN ASSEMBLY OF NAIL GUN AND BONDING METHOD THEREOF

(71) Applicant: Hsieh-Lin Liao, Taichung (TW)

(72) Inventor: Hsieh-Lin Liao, Taichung (TW)

(73) Assignee: AFICIAL CO., LTD., Taichung (TW)

( * ) Notice: Subject to any disclaimer, the term of this patent is extended or adjusted under 35 U.S.C. 154(b) by 94 days.

(21) Appl. No.: 16/372,313

(22) Filed: Apr. 1, 2019

(65) Prior Publication Data

US 2019/0224824 A1   Jul. 25, 2019

Related U.S. Application Data

(62) Division of application No. 15/403,265, filed on Jan. 11, 2017, now Pat. No. 10,906,165.

(51) Int. Cl.
| | | |
|---|---|---|
| *B23K 31/00* | (2006.01) | |
| *B25C 1/00* | (2006.01) | |
| *B23K 103/18* | (2006.01) | |

(52) U.S. Cl.
CPC ............ *B25C 1/00* (2013.01); *B23K 2103/18* (2018.08)

(58) Field of Classification Search
CPC .......... F41A 11/02; F41A 17/64; F41A 19/13; B23K 2103/18
See application file for complete search history.

(56) References Cited

U.S. PATENT DOCUMENTS

| | | | | | |
|---|---|---|---|---|---|
| 3,056,226 | A | * | 10/1962 | Hubbard | F41A 19/13 42/69.02 |
| 4,246,830 | A | * | 1/1981 | Krieger | F41A 19/13 89/132 |
| 4,313,996 | A | * | 2/1982 | Newman | B32B 15/08 156/199 |
| 5,421,119 | A | * | 6/1995 | Miner | F41A 19/13 42/69.01 |
| 5,537,769 | A | * | 7/1996 | Hargraves | F41A 19/13 42/69.01 |
| 5,657,919 | A | * | 8/1997 | Berry | B25C 1/143 227/10 |
| 2006/0112604 | A1 | * | 6/2006 | Stone | F41A 19/13 42/69.01 |
| 2007/0034663 | A1 | * | 2/2007 | Wey | B25C 1/047 227/130 |

* cited by examiner

*Primary Examiner* — Anna K Kinsaul
*Assistant Examiner* — Eyamindae C Jallow
(74) *Attorney, Agent, or Firm* — Demian K. Jackson; Jackson IPG PLLC

(57) ABSTRACT

A firing pin assembly of a nail gun and a bonding method thereof are provided. The firing pin assembly includes a firing pin body and a firing pin head made of a material having a hardness greater than that of the firing pin body. The firing pin head has a first end and a second end. The first end is made of a material having a density lower than that of the second end. The first end and the front end face of the firing pin body are preheated to a set temperature. The top of the second end is pressed toward the front end face of the firing pin body for an appropriate bonding time, so that the material particles of the firing pin body are dissociated and fused into the first end of the firing pin head to form the firing pin assembly.

4 Claims, 8 Drawing Sheets

FIRING PIN ASSEMBLY OF NAIL GUN AND BONDING METHOD THEREOF

FIELD OF THE INVENTION

The present invention relates to a firing pin assembly of a nail gun, and more particularly to a firing pin assembly of a nail gun and a bonding method thereof. The firing pin assembly has impact resistance, wear resistance, high toughness.

BACKGROUND OF THE INVENTION

A power-driven nail gun has been widely used for decoration work, construction, and furniture. The nozzle of the nail gun is provided with a firing pin for continuously firing nails stored in a nail case. The impact force of the continuous firing will inevitably result in wear and tear of the front end of the firing pin. In addition, the existing firing pins on the market are made of single steel or a material having low hardness. In general, the material has a Rockwell hardness of 48-59. If this firing pin is used for continuous firing, because the relative hardness difference between the firing pin and the nails is not large, the firing pin will suffer a lot of wear and tear. Uneven wear may cause the deformation of the firing pin. Accordingly, the inventor of the present invention has devoted himself based on his many years of practical experiences to solve these problems.

SUMMARY OF THE INVENTION

The primary object of the present invention is to provide a firing pin assembly of a nail gun and a bonding method thereof. The firing pin assembly has the advantages of impact resistance, wear resistance, high toughness.

In order to achieve the aforesaid object, the firing pin assembly of the present invention comprises a firing pin body and a firing pin head connected to a front end face of the firing pin body and made of a material having a hardness greater than that of firing pin body. The firing pin head has an outer diameter same as that of a front section of firing pin body. The firing pin head has a first end and a second end integral with the first end. The first end is made of a material having a density lower than that of the second end. The first end of the firing pin head is bonded to the front end face of the firing pin body. The firing pin head and the firing pin body are upright aligned with each other. A bottom surface of the first end of the firing pin head is spaced a predetermined distance apart from the front end face of the firing pin body. The firing pin head and the firing pin body are preheated to a set temperature so that the particles having a lower melting point of the materials of the firing pin body and the firing pin head are close to be melted to generate high adhesiveness. The top of the second end of the firing pin head is pressed toward the front end face of the firing pin body for an appropriate bonding time so that the particles of the material of the firing pin body are dissociated and fused into the first end of the firing pin head to join the firing pin body and the firing pin head together to form the firing pin assembly having the advantages of impact resistance, wear resistance, high toughness.

The firing pin head has the first end and the second end integral with the first end. The first end is made of a material having a density lower than that of the second end. The first end of the firing pin head is bonded to the front end face of the firing pin body. The firing pin head and the firing pin body are upright aligned with each other. The firing pin head and the firing pin body are preheated to a set temperature so that the particles having a lower melting point of the materials of the firing pin body and the firing pin head are close to be melted to generate high adhesiveness. The top of the second end of the firing pin head is pressed toward the front end face of the firing pin body for an appropriate bonding time so that the particles of the material of the firing pin body are dissociated and fused into the first end of the firing pin head to join the firing pin body and the firing pin head together effectively.

The second end of the firing pin head functions as the firing pin of the nail gun for firing nails. Because the second end of the firing pin head is made of a material having a high density and having a hardness higher than that of the firing pin body, the firing pin assembly has the advantages of impact resistance, wear resistance, high toughness.

DETAILED DESCRIPTION OF THE PREFERRED EMBODIMENTS

Embodiments of the present invention will now be described, by way of example only, with reference to the accompanying drawings.

Figure 1:
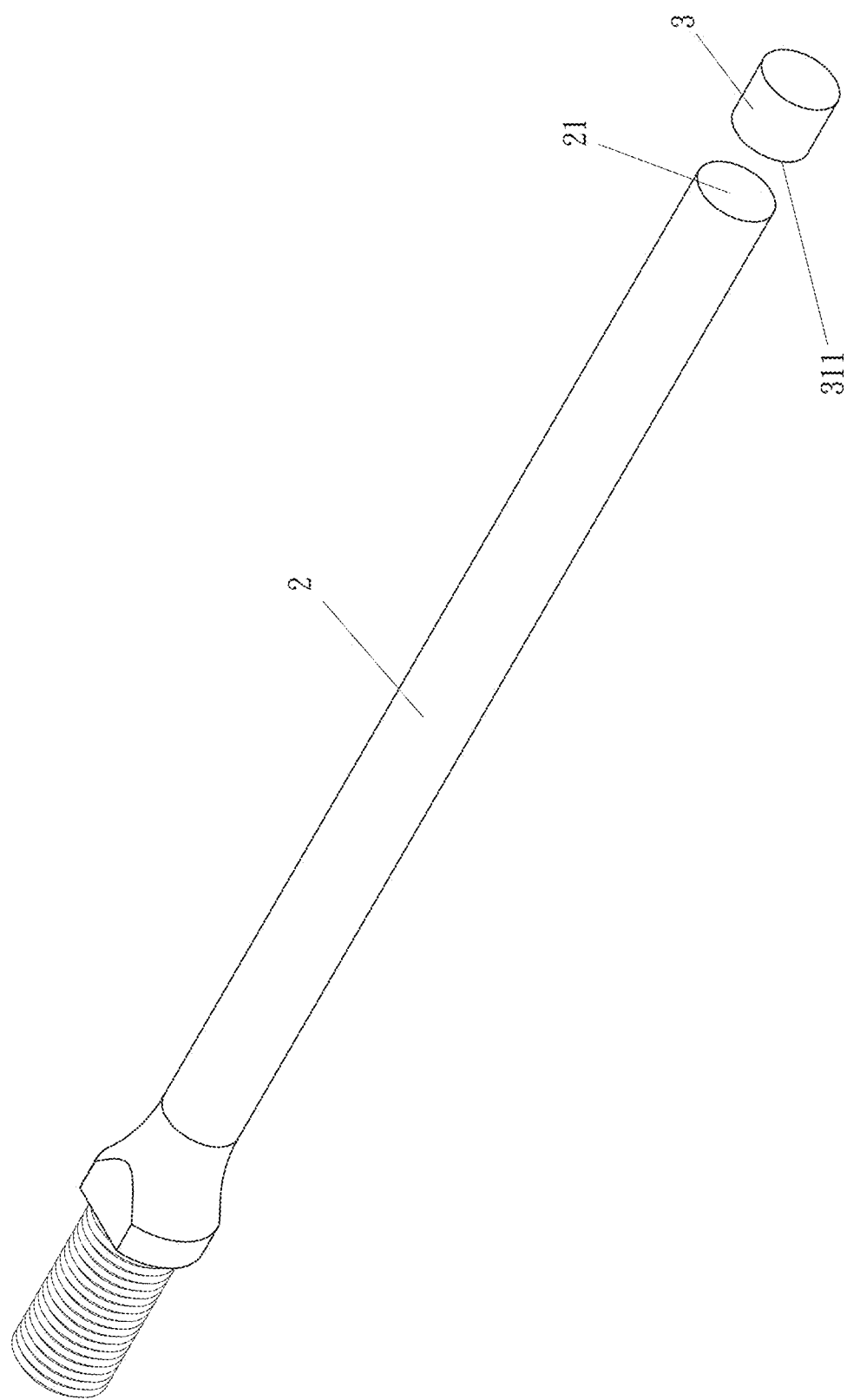
FIG. 1 is an exploded view in accordance with a first embodiment and a third embodiment of the present invention.
Figure 2:
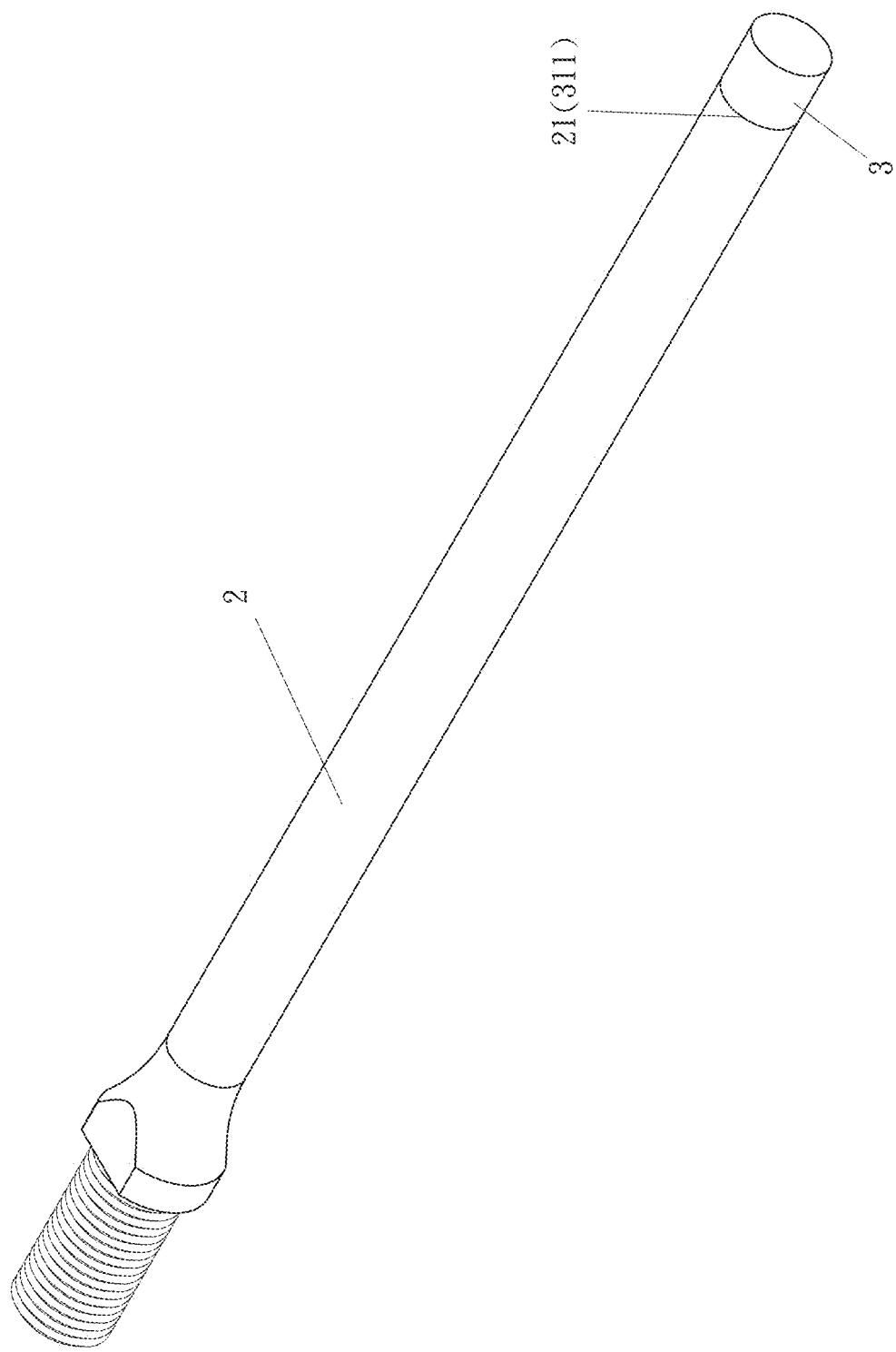
FIG. 2 is a perspective view of FIG. 1.
Figures 3, 4:
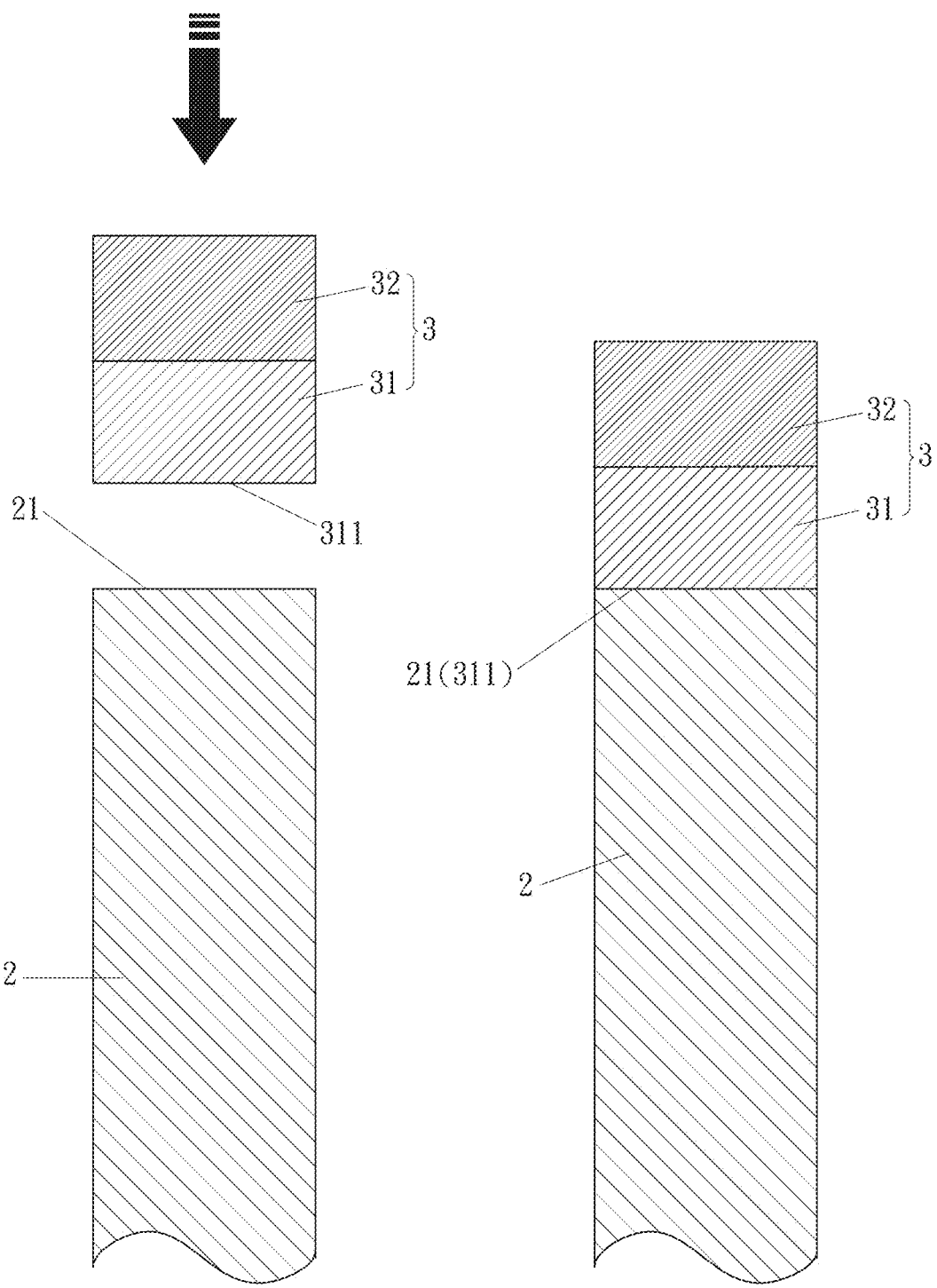
FIG. 3 is a partial sectional schematic view showing the operation of the first embodiment of the present invention.
FIG. 4 is an assembled sectional schematic view of FIG. 3.

FIGS. 1-4 illustrate a firing pin assembly of a nail gun and a bonding method according to a first embodiment the present invention. The firing pin assembly comprises a firing pin body 2 made of a material having a Rockwell hardness of 42-95 and a firing pin head 3 connected to a front end face 21 of the firing pin body 2 and made of a material having a Rockwell hardness of 60-100. The firing pin head 3 has an outer diameter same as that of a front section of firing pin body 2. The firing pin head 3 has a first end 31 and a second end 32 integral with the first end 31. The first end 31 is made of a material having a density lower than that of the second end 32. The first end 31 of the firing pin head 3 is disposed relative to the front end face 21 of the firing pin body 2. The firing pin head 3 and the firing pin body 2 are upright aligned with each other, and a bottom surface 311 of the first end 31 of the firing pin head 3 is spaced a predetermined distance apart from the front end face 21 of the firing pin body 2, and the firing pin head 3 and the firing pin body 2 are simultaneously preheated to a set temperature (in the range of 300° C. to 6000° C., depending on the materials of the firing pin body 2 and the firing pin head 3). The particles having a lower melting point of the materials of the firing pin body 2 and the firing pin head 3 are close to be melted to generate high adhesiveness. The top of the second end 32 of the firing pin head 3 is pressed toward the front end face 21 of the firing pin body 2 for an appropriate bonding time, so that the particles of the material of the firing pin body 2 are dissociated and fused into the first end 31 of the firing pin head 3 to join the firing pin body 2 and the firing pin head 3 together to form the firing pin assembly. The bonding time is between about 3 seconds and 24 hours, depending on the time required for the crystal structure to be intact and stable after the particles are fused. The firing pin assembly has the advantages of impact resistance, wear resistance, high toughness.

Figure 5:
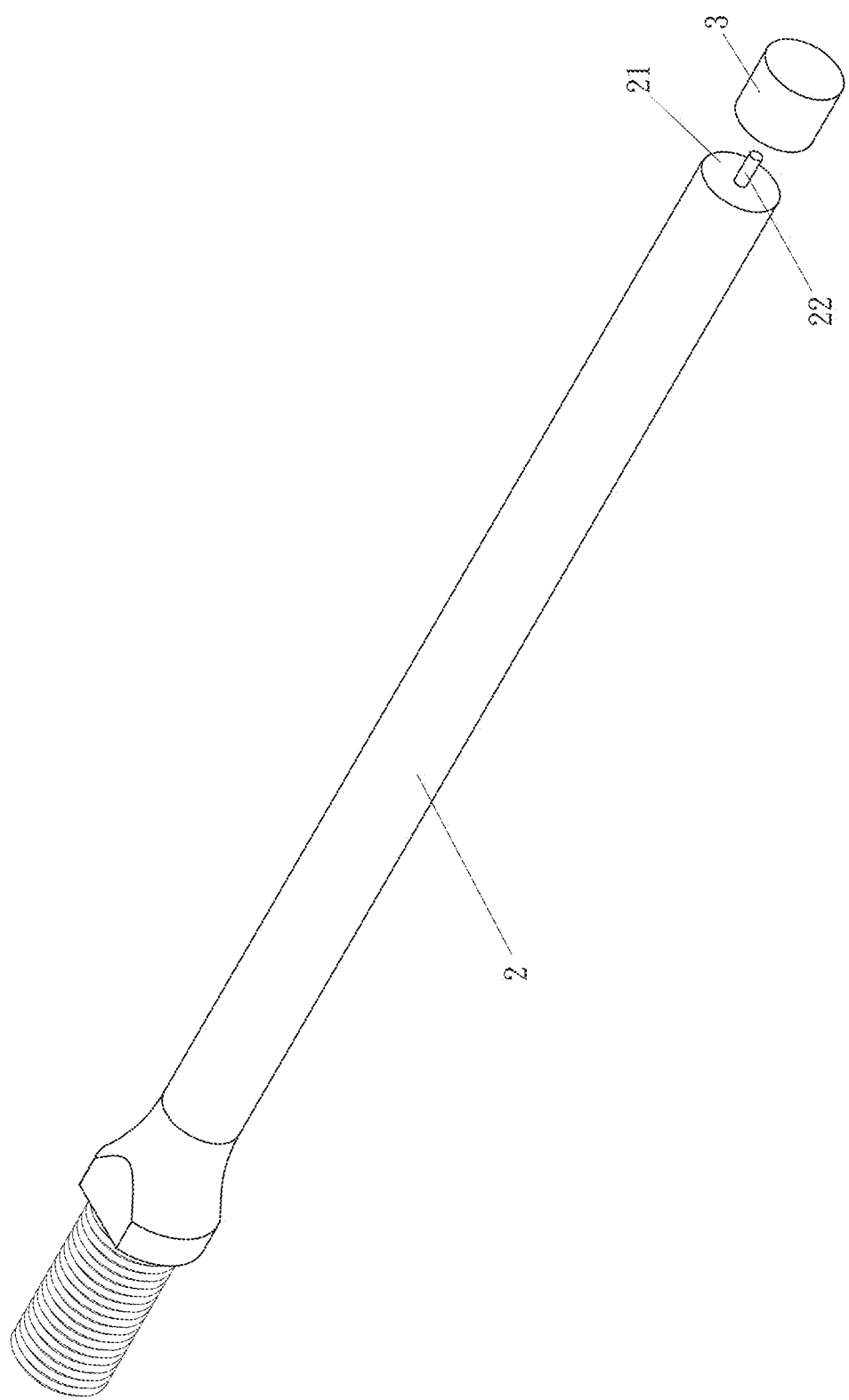
FIG. 5 is an exploded view in accordance with a second embodiment and a fourth embodiment of the present invention.
Figure 6:
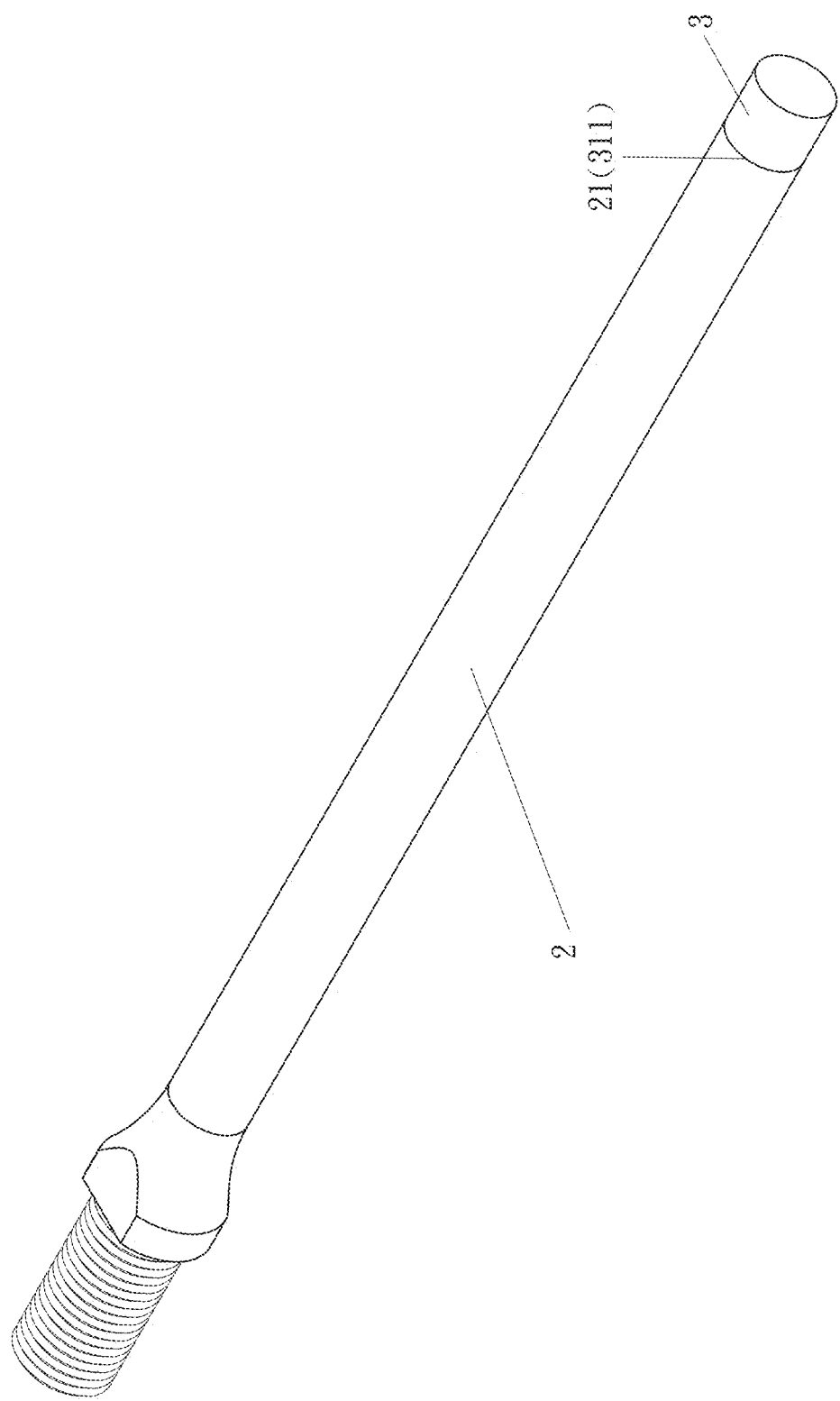
FIG. 6 is a perspective view of FIG. 5.
Figure 7:
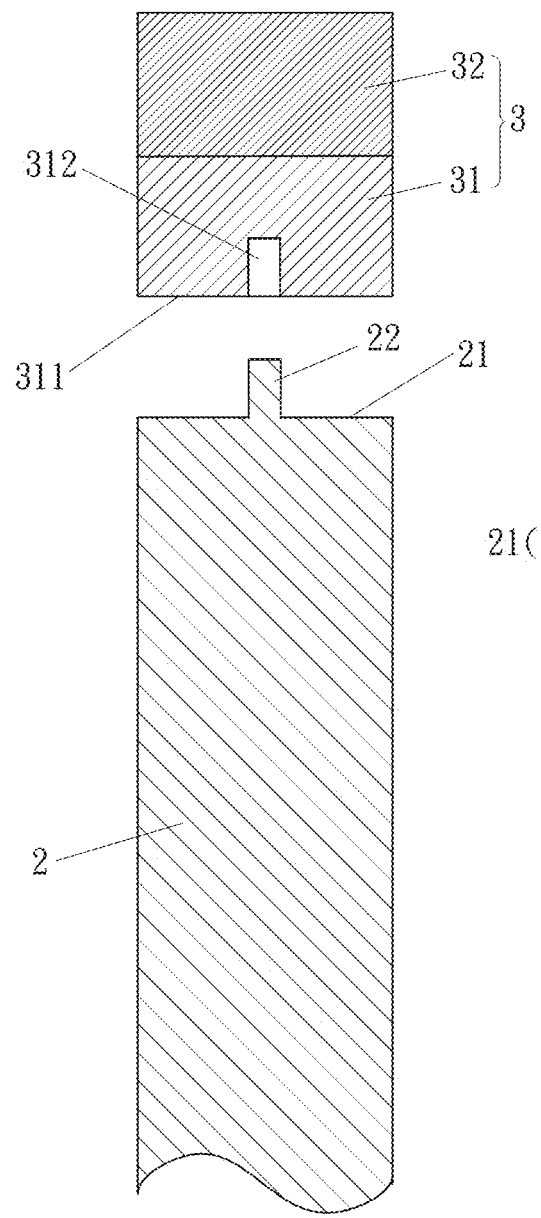
FIG. 7 is a partial sectional schematic view showing the operation of the second embodiment of the present invention.
Figure 8:
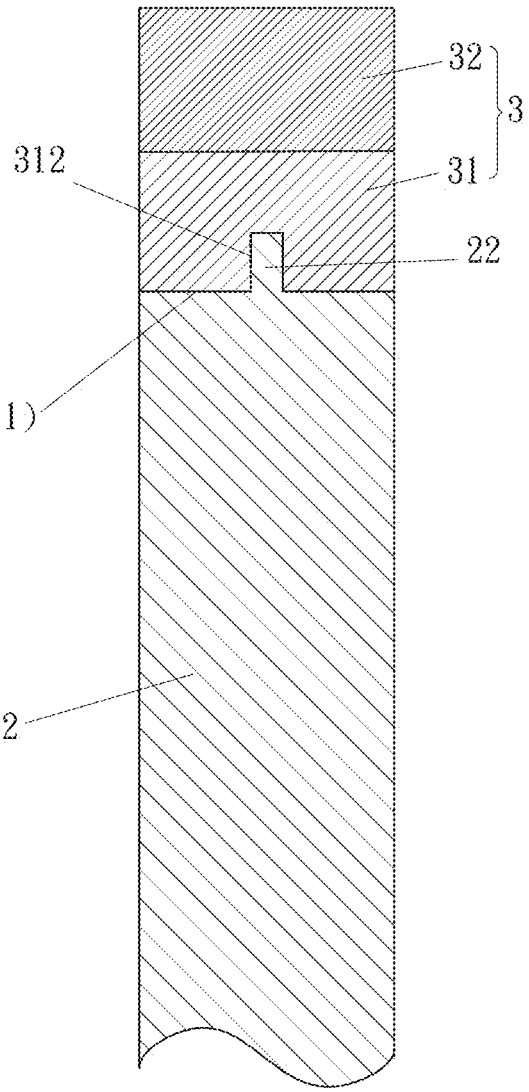
FIG. 8 is an assembled sectional schematic view of FIG. 7.

FIGS. 5-8 illustrate a firing pin assembly of a nail gun and a bonding method according to a second embodiment the present invention. The firing pin assembly comprises a firing pin body 2 made of a material having a Rockwell hardness of 42-95 and a firing pin head 3 connected to a front end face 21 of the firing pin body 2 and made of a material having a Rockwell hardness of 60-100. The front end face 21 of the firing pin body 2 is provided with a connecting post 22. The firing pin head 3 has an outer diameter same as that of a front section of firing pin body 2. The firing pin head 3 has a first end 31 and a second end 32 integral with the first end 31. The first end 31 is made of a material having a density lower than that of the second end 32. A bottom surface 311 of the first end 31 of the firing pin head 3 is formed with an engaging recess 312 corresponding to the connecting post 22 of the front end face 21 of the firing pin body 2. The firing pin head 3 and the firing pin body 2 are upright aligned with each other, and the bottom surface 311 of the first end 31 of the firing pin head 3 is spaced a predetermined distance apart from the front end face 21 of the firing pin body 2, and the firing pin head 3 and the firing pin body 2 are simultaneously preheated to a set temperature (in the range of 300° C. to 6000° C., depending on the materials of the firing pin body 2 and the firing pin head 3). The particles having a lower melting point of the materials of the firing pin body 2 and the firing pin head 3 are close to be melted to generate high adhesiveness. When the top of the second end 32 of the firing pin head 3 is pressed toward the front end face 21 of the firing pin body 2, the connecting post 22 of the front end face 21 of the firing pin body 2 is bonded to the engaging recess 312 of the bottom surface 311 of the first end 31 of the firing pin head 3. For an appropriate bonding time, the particles of the material of the firing pin body 2 are dissociated and fused into the first end 31 of the firing pin head 3 to join the firing pin body 2 and the firing pin head 3 together to form the firing pin assembly. The bonding time is between about 3 seconds and 24 hours, depending on the time required for the crystal structure to be intact and stable after the particles are fused. The firing pin assembly has the advantages of impact resistance, wear resistance, high toughness.

During firing, the firing pin assembly is used to fire nails in succession. The second end 32 of the firing pin head 3 functions as the firing surface to get in contact with the nails, so that the firing force (i.e., a lateral impact force) applied to the firing surface facilitates the connection between the front end surface 21 of the firing pin body 2 and the bottom surface 311 of the first end 31 of the firing pin head 3 as well as the connection between the connecting post 22 of the front end surface 21 of the firing pin body 2 and the engaging recess 312 of the bottom surface 311 of the first end 31 of the firing pin head 3 so as to increase the joint area of the firing pin body 2 and the firing pin head 3 and to enhance the impact resistance effect when the firing pin assembly is subjected to the lateral impact force.

Figure 9:
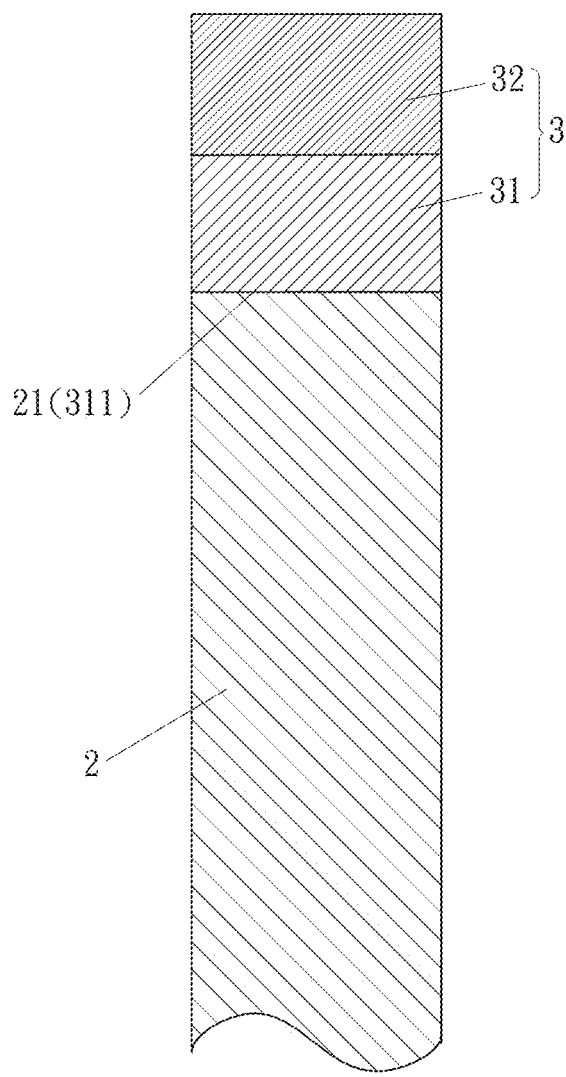
FIG. 9 is a partial sectional schematic view showing the operation of the third embodiment of the present invention.
Figure 10:
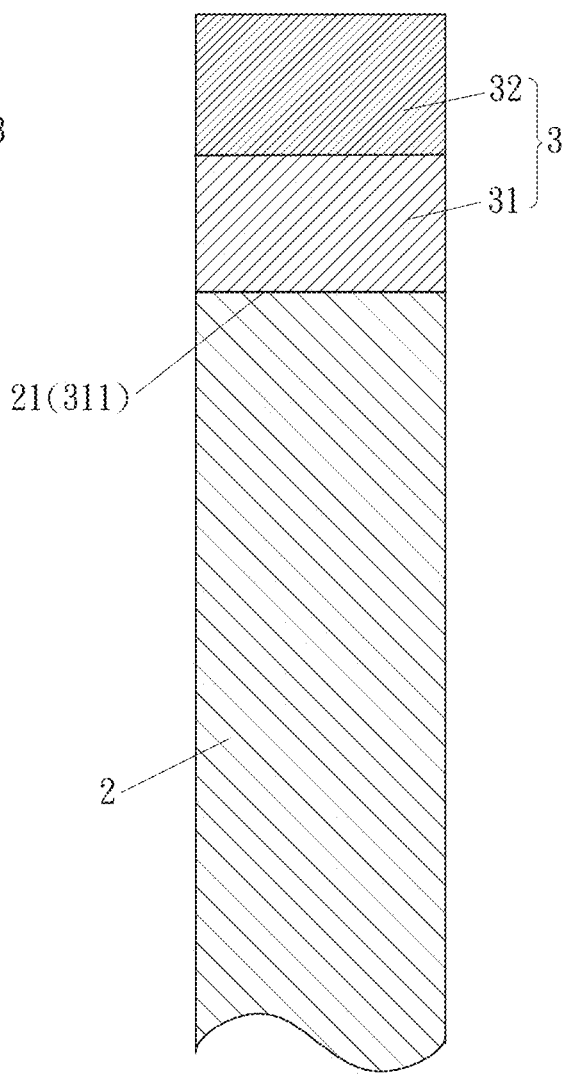
FIG. 10 is an assembled sectional schematic view of FIG. 9.

FIGS. 1, 2, 9, and 10 illustrate a firing pin assembly of a nail gun and a bonding method according to a third embodiment the present invention. The firing pin assembly comprises a firing pin body 2 made of a material having a Rockwell hardness of 42-95 and a firing pin head 3 connected to a front end face 21 of the firing pin body 2 and made of a material having a Rockwell hardness of 60-100. The firing pin head 3 has an outer diameter same as that of a front section of firing pin body 2. The firing pin head 3 has a first end 31 and a second end 32 integral with the first end 31. The first end 31 is made of a material having a density lower than that of the second end 32. The first end 31 of the firing pin head 3 is disposed relative to the front end face 21 of the firing pin body 2. The firing pin head 3 and the firing pin body 2 are upright aligned with each other, and a bottom surface 311 of the first end 31 of the firing pin head 3 is directly attached to the front end face 21 of the firing pin body 2, and the firing pin head 3 and the firing pin body 2 are simultaneously preheated to a set temperature (in the range of 300° C. to 6000° C., depending on the materials of the firing pin body 2 and the firing pin head 3). The particles having a lower melting point of the materials of the firing pin body 2 and the firing pin head 3 are close to be melted to generate high adhesiveness. The top of the second end 32 of the firing pin head 3 is pressed toward the front end face 21 of the firing pin body 2 for an appropriate bonding time, so that the particles of the material of the firing pin body 2 are dissociated and fused into the first end 31 of the firing pin head 3 to join the firing pin body 2 and the firing pin head 3 together to form the firing pin assembly. The bonding time is between about 3 seconds and 24 hours, depending on the time required for the crystal structure to be intact and stable after the particles are fused. The firing pin assembly has the advantages of impact resistance, wear resistance, high toughness.

Figure 11:
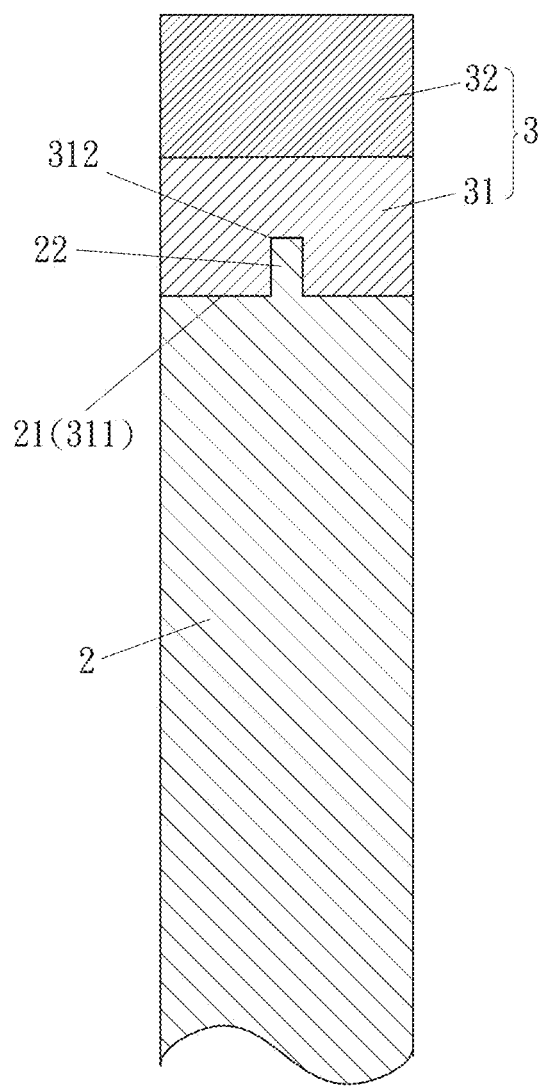
FIG. 11 is a partial sectional schematic view showing the operation of the fourth embodiment of the present invention.
Figure 12:
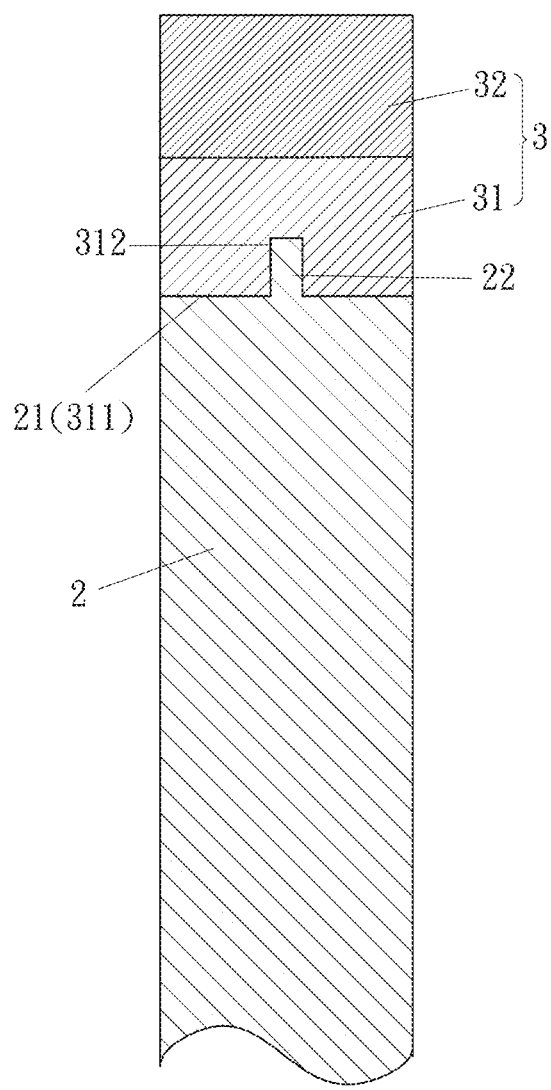
FIG. 12 is an assembled sectional schematic view of FIG. 11.

FIGS. 5, 6, 11, and 12 illustrate a firing pin assembly of a nail gun and a bonding method according to a fourth embodiment the present invention. The firing pin assembly comprises a firing pin body 2 made of a material having a Rockwell hardness of 42-95 and a firing pin head 3 connected to a front end face 21 of the firing pin body 2 and made of a material having a Rockwell hardness of 60-100. The front end face 21 of the firing pin body 2 is provided with a connecting post 22. The firing pin head 3 has an outer diameter same as that of a front section of firing pin body 2. The firing pin head 3 has a first end 31 and a second end 32 integral with the first end 31. The first end 31 is made of a material having a density lower than that of the second end 32. A bottom surface 311 of the first end 31 of the firing pin head 3 is formed with an engaging recess 312 corresponding to the connecting post 22 of the front end face 21 of the firing pin body 2. The firing pin head 3 and the firing pin body 2 are upright aligned with each other, and the front end face 21 of the firing pin body 2 is attached to the bottom surface 311 of the first end 31 of the firing pin head 3, and the connecting post 22 of the front end face 21 of the firing pin body 2 is engaged in the engaging recess 312 of the bottom surface 311 of the first end 31 of the firing pin head 3, and the firing pin head 3 and the firing pin body 2 are simultaneously preheated to a set temperature (in the range of 300° C. to 6000° C., depending on the materials of the firing pin body 2 and the firing pin head 3). The particles having a lower melting point of the materials of the firing pin body 2 and the firing pin head 3 are close to be melted to generate high adhesiveness. When the top of the second end 32 of the firing pin head 3 is pressed toward the front end face 21 of the firing pin body 2 for an appropriate bonding time, the particles of the material of the firing pin body 2 are dissociated and fused into the first end 31 of the firing pin head 3 to join the firing pin body 2 and the firing pin head 3 together to form the firing pin assembly. The bonding time is between about 3 seconds and 24 hours, depending on the time required for the crystal structure to be intact and stable after the particles are fused. The firing pin assembly has the advantages of impact resistance, wear resistance, high toughness.

During firing, the firing pin assembly is used to fire nails in succession. The second end 32 of the firing pin head 3 functions as the firing surface to get in contact with the nails, so that the firing force (i.e., a lateral impact force) applied to the firing surface facilitates the connection between the front end surface 21 of the firing pin body 2 and the bottom surface 311 of the first end 31 of the firing pin head 3 as well as the connection between the connecting post 22 of the front end surface 21 of the firing pin body 2 and the engaging recess 312 of the bottom surface 311 of the first end 31 of the firing pin head 3 so as to increase the joint area of the firing pin body 2 and the firing pin head 3 and to enhance the impact resistance effect when the firing pin assembly is subjected to the lateral impact force.

In summary, the firing pin assembly and the bonding method of the present invention do provide a combination of a firing pin body and a firing pin head of two materials having different hardness to solve the problem of the conventional firing pin in use to improve uneven wear and to avoid fracture. The firing pin assembly of the present invention has the advantages of impact resistance, wear resistance, high toughness.

Although particular embodiments of the present invention have been described in detail for purposes of illustration, various modifications and enhancements may be made without departing from the spirit and scope of the present invention. Accordingly, the present invention is not to be limited EXCEPT as by the appended claims.

What is claimed is:

1. A bonding method of a firing pin assembly of a nail gun, the firing pin assembly comprising a firing pin body and a firing pin head connected to a front end face of the firing pin body and made of a material having a hardness greater than that of firing pin body; the firing pin head having an outer diameter same as that of a front section of firing pin body, the firing pin head including a first end and a second end integral with the first end, the first end being made of a material having a density lower than that of the second end, the first end of the firing pin head being bonded to the front end face of the firing pin body, the bonding method comprising:
   the firing pin head and the firing pin body being upright aligned with each other;
   a bottom surface of the first end of the firing pin head being spaced a predetermined distance apart from the front end face of the firing pin body;
   the firing pin head and the firing pin body being preheated to a set temperature so that particles having a lower melting point of the materials of the firing pin body and the firing pin head are close to be melted to generate high adhesiveness; and
   a top of the second end of the firing pin head being pressed toward the front end face of the firing pin body for a predetermined bonding time so that the particles of the material of the firing pin body are dissociated and fused into the first end of the firing pin head to join the firing pin body and the firing pin head together.

2. The bonding method as claimed in claim 1, wherein the bonding time is between 3 seconds and 24 hours.

3. A bonding method of a firing pin assembly of a nail gun, the firing pin assembly comprising a firing pin body and a firing pin head connected to a front end face of the firing pin body and made of a material having a hardness greater than that of the firing pin body; the firing pin head having an outer diameter the same as that of a front section of the firing pin body, the firing pin head including a first end and a second end integral with the first end, the first end being made of a material having a density lower than that of the second end, the first end of the firing pin head being bonded to the front end face of the firing pin body, the bonding method comprising:
   the firing pin head and the firing pin body being upright aligned with each other;
   a bottom surface of the first end of the firing pin head being directly attached to the front end face of the firing pin body;
   the firing pin head and the firing pin body being preheated to a set temperature so that particles having a lower melting point of the materials of the firing pin body and the firing pin head are close to be melted to generate high adhesiveness; and
   a top of the second end of the firing pin head being pressed toward the front end face of the firing pin body for a predetermined bonding time so that the particles of the material of the firing pin body are dissociated and fused into the first end of the firing pin head to join the firing pin body and the firing pin head together.

4. The bonding method as claimed in claim 3, wherein the bonding time is between 3 seconds and 24 hours.

\* \* \* \* \*